(12) United States Patent
Ritzèn et al.

(10) Patent No.: US 6,510,321 B2
(45) Date of Patent: *Jan. 21, 2003

(54) CELLULAR COMMUNICATIONS NETWORK AND METHOD FOR MAINTAINING SPEECH QUALITY BY CONTROLLING THE ADMISSION OF A NEW CALL

(75) Inventors: Benny Ritzèn, Stockholm (SE); Patrik Cerwall, Tyresö (SE)

(73) Assignee: Telefonaktiedolaget L M Ericsson (publ) (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,088

(22) Filed: Nov. 9, 1998

(65) Prior Publication Data

US 2002/0068576 A1 Jun. 6, 2002

(51) Int. Cl.[7] .................................................. H04Q 7/20
(52) U.S. Cl. ........................ 455/450; 455/444; 455/526
(58) Field of Search ................................. 455/450, 451, 455/452, 453, 436, 437, 438, 439, 442, 443, 444, 509, 513, 525, 446

(56) References Cited

U.S. PATENT DOCUMENTS

| | | | |
|---|---|---|---|
| 4,670,899 A | 6/1987 | Brody et al. ................... 379/60 |
| 5,241,685 A | 8/1993 | Bodin et al. ................ 455/33.2 |
| 5,365,571 A | * 11/1994 | Rha et al. .................... 455/446 |
| 5,455,967 A | 10/1995 | Amezawa et al. ............. 455/69 |
| 5,475,861 A | 12/1995 | Hall ........................... 455/33.1 |
| 5,499,395 A | 3/1996 | Doi et al. ................... 455/33.1 |
| 5,504,938 A | 4/1996 | Redden ...................... 455/33.4 |
| 5,701,585 A | 12/1997 | Kallin et al. ................ 455/33.2 |
| 5,722,044 A | 2/1998 | Padovani et al. ........... 455/33.1 |
| 5,740,537 A | 4/1998 | Beming et al. ............. 455/450 |
| 5,754,959 A | 5/1998 | Ueno et al. ................. 455/453 |
| 5,781,861 A | * 7/1998 | Kang et al. ................. 455/442 |
| 5,784,360 A | 7/1998 | I et al. ........................ 370/252 |
| 5,790,955 A | 8/1998 | Tomoike ..................... 455/453 |
| 5,850,604 A | * 12/1998 | Dufour et al. .......... 455/450 X |
| 6,108,321 A | * 8/2000 | Anderson et al. ....... 455/452 X |
| 6,154,655 A | * 11/2000 | Borst et al. ................. 455/451 |

FOREIGN PATENT DOCUMENTS

| | | | |
|---|---|---|---|
| EP | 0 182 027 | 5/1986 | |
| GB | 2 281 011 | 2/1995 | |
| GB | 2 311 191 | 9/1997 | |
| WO | WO 96/19087 | * 6/1996 | ............ H04Q/7/38 |
| WO | WO 98/16029 | 4/1998 | |

OTHER PUBLICATIONS

Standard EPO Search Report, Jul. 22, 1999.

* cited by examiner

*Primary Examiner*—William Trost
*Assistant Examiner*—Philip J. Sobutka
(74) *Attorney, Agent, or Firm*—Jenkins & Gilchrist, A Professional Corporation

(57) ABSTRACT

A method and cellular communication network are provided that maintains a desired level of speech quality by controlling the admission of a new call within a serving cell of the network. More specifically, the method includes the step of establishing speech quality values for a serving cell and at least one of a plurality of surrounding cells being interfered with by the serving cell. The method then operates to determine whether or not to admit the new call to the serving cell by utilizing the speech quality measure of the serving cell and the speech quality measure of the at least one surrounding cell in a predetermined manner (e.g., cell level approach, sub-cell approach and combined approach) so as to maintain the desired level of speech quality within the serving cell and the at least one surrounding cell.

18 Claims, 3 Drawing Sheets

CELLULAR COMMUNICATIONS NETWORK AND METHOD FOR MAINTAINING SPEECH QUALITY BY CONTROLLING THE ADMISSION OF A NEW CALL

CROSS REFERENCE TO RELATED APPLICATIONS

This application is related to a U.S. Application Ser. No. 09/189,099 entitled "Cellular Communications Network and Method for Dynamically Changing the Size of a Cell Due to Speech Quality" which is hereby incorporated by reference herein. The U.S. Application was filed on Nov. 9, 1998 in the names of Benny Ritzèn and Patrik Cerwall and assigned to Telefonaktiebolaget L M Ericsson.

BACKGROUND OF THE INVENTION

1. Technical Field of the Invention

The present invention generally relates to the telecommunications field and, in particular, to a cellular communications network and method that maintains a desired speech quality by determining whether or not to admit a new call within a serving cell based on the current speech quality in the serving cell and the current speech quality in other cells interfered with by the serving cell.

2. Description of Related Art

In order to improve the radio environment of today's cellular communications networks, many operators utilize automated planning techniques (e.g., Adaptive Frequency Allocation) to assist with frequency planning and cell assignment decisions that help maintain speech quality by minimizing the interference. The current automated planning techniques are defensively designed and have large safety margins to ensure that "good" speech quality is maintained throughout the entire cellular telecommunications network.

Unfortunately, it is very expensive to use the current automated cell planning techniques to ensure that "good" speech quality is maintained throughout the entire cellular telecommunications network. In addition, the current automated cell planning techniques often increase the already high maintenance costs due to the large safety margins by requiring the addition of new cells that may not necessarily be required.

Accordingly, there is a need for a method and cellular communication network capable of maintaining "good" speech quality within a particular part of the network by determining whether or not to admit a new call in a serving cell based on the current speech quality in the serving cell and the current speech quality in other cells interfered with by the serving cell. This and other needs are satisfied by the cellular communications network and method of the present invention.

SUMMARY OF THE INVENTION

The present invention is a method and cellular communication network that maintains a desired level of speech quality by controlling the admission of a new call within a serving cell of the network. More specifically, the method includes the step of establishing speech quality values for a serving cell and at least one of a plurality of surrounding cells being interfered with by the serving cell. The method then operates to determine whether or not to admit the new call to the serving cell by utilizing the speech quality measure of the serving cell and the speech quality measure of the at least one surrounding cell in a predetermined manner (e.g., cell level approach, sub-cell approach and combined approach) so as to maintain the desired level of speech quality within the serving cell and the at least one surrounding cell.

In accordance with the present invention, there is provided a method and cellular communications network that maintains a desired level of speech quality by controlling the admission of new calls and handovers of ongoing calls to a serving cell.

Also in accordance with the present invention, there is provided a method and cellular communications network capable of reducing the large safety margins and high costs commonly associated with the current cell planning techniques.

Also in accordance with the present invention, there is provided a method and cellular communications network that determines whether or not to admit a new call based on a cell level approach, sub-cell level approach or a combined approach.

Further in accordance with the present invention, there is provided a method and cellular communications network capable of operating in accordance with any telecommunications standard that supports mobile assisted handovers such as, for example, the Global System for Mobile Communications (GSM) standard.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
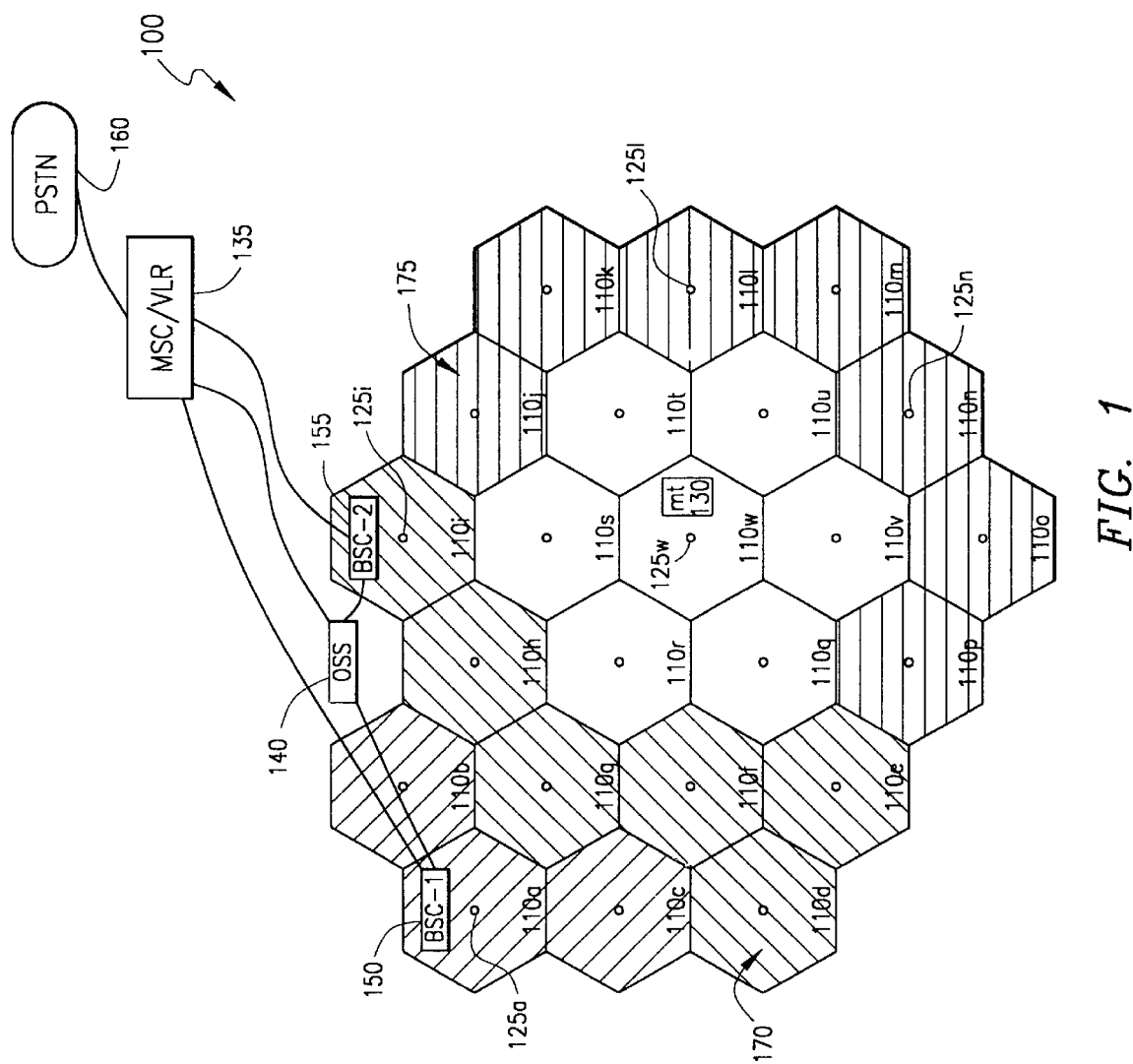
FIG. 1 is a simplified block diagram of an exemplary cellular communications network that can be used to implement a preferred admission control method of the present invention.
Figure 2:
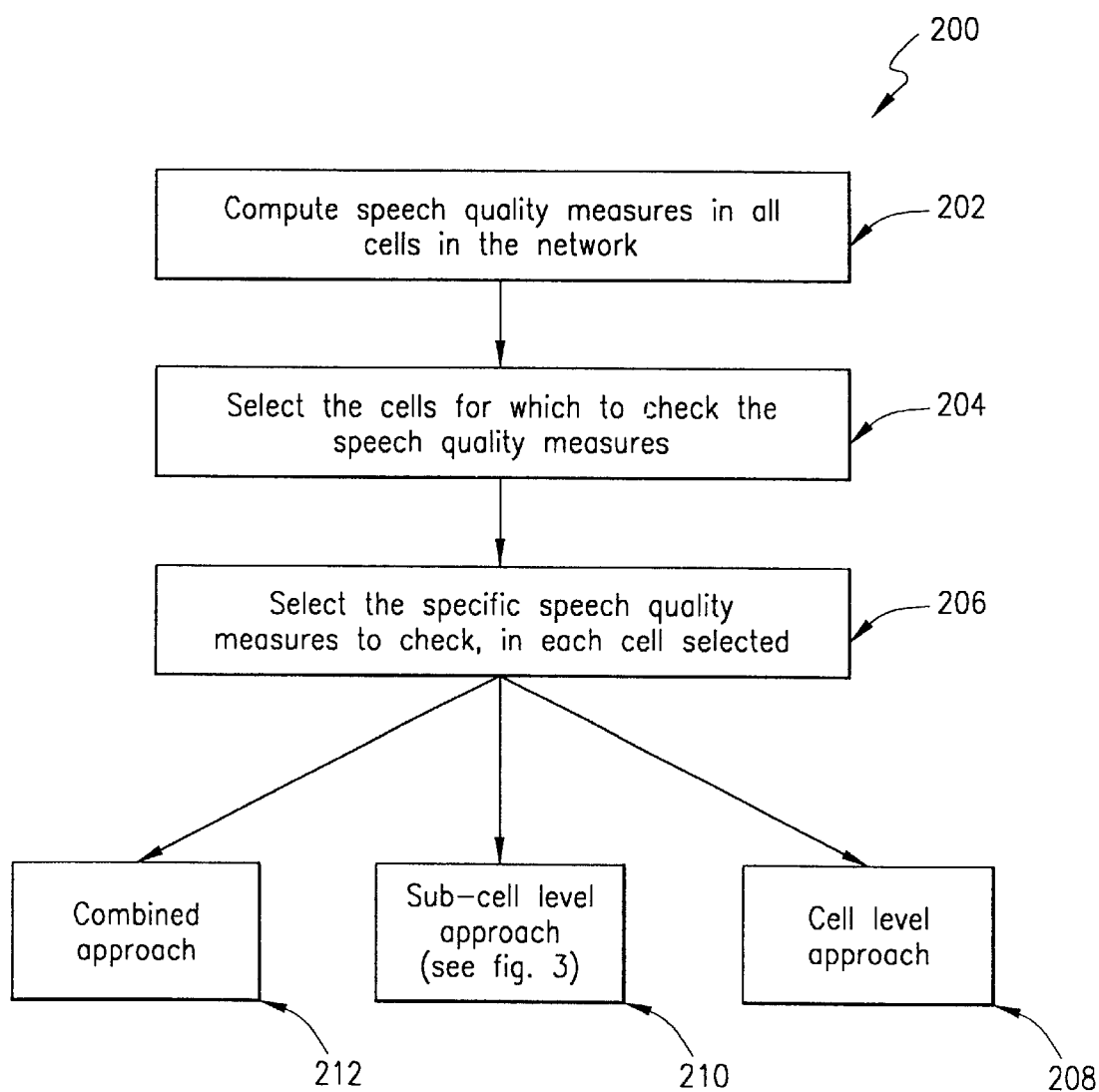
FIG. 2 is a simplified flow diagram of the admission control method used to maintain the speech quality within the cellular communications network shown in FIG. 1.
Figure 3:
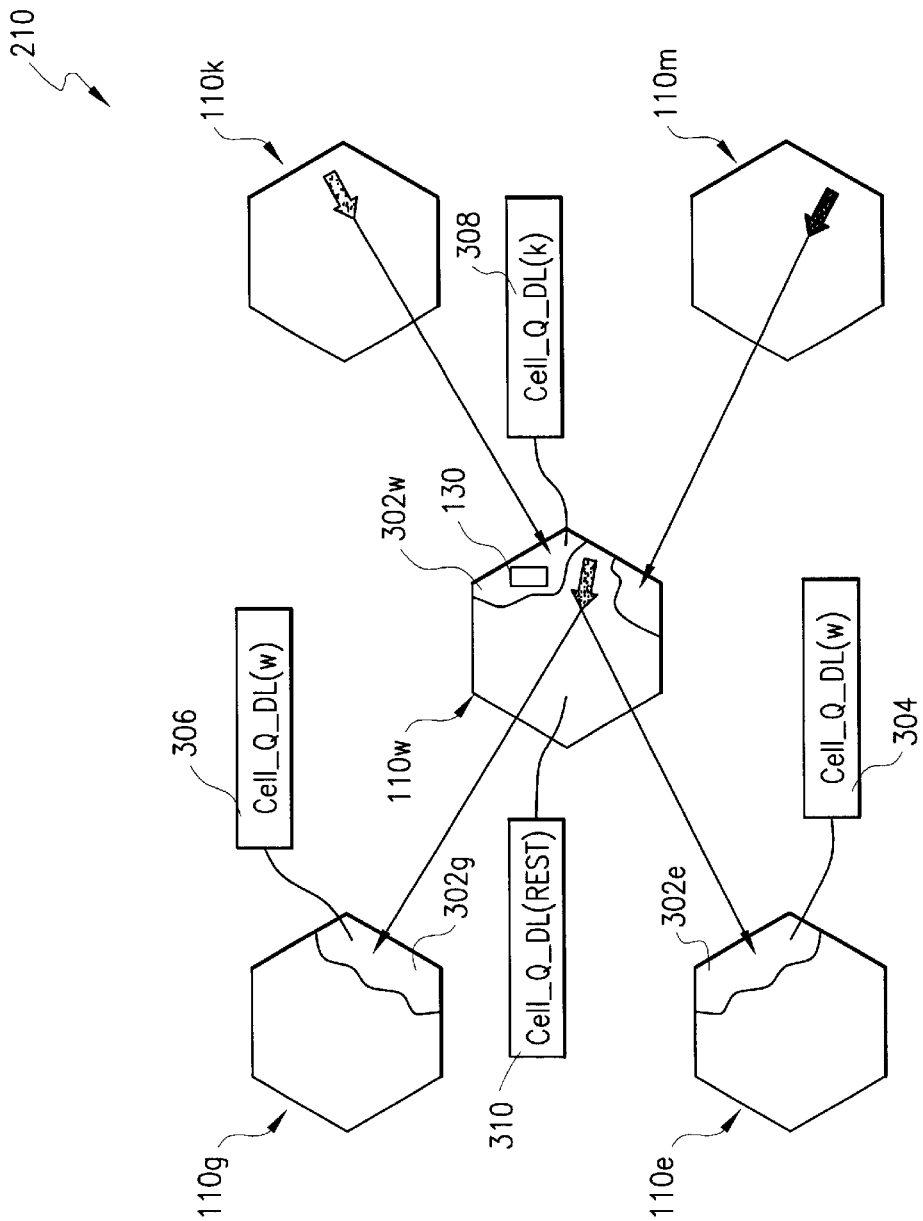
FIG. 3 is a simplified block diagram illustrating in greater detail a sub-cell level approach that can be used by the admission control method shown in FIG. 2.

Referring to the Drawings, wherein like numerals represent like parts throughout FIGS. 1–3, there are disclosed an exemplary cellular communications network 100 (FIG. 1) and an admission control method 200 (FIGS. 2–3) in accordance with the present invention.

Although the cellular communications network 100 will be discussed with reference to the Global System for Mobile Communications (GSM) standard, those skilled in the art will appreciate that other standards and specifications may also utilize the principles of the present invention especially if they support mobile assisted handover (MAHO) technology. Accordingly, the cellular communications network 100 described should not be construed in such a limited manner.

In order to better describe the present invention, a detailed description about the admission control method 200 used by the cellular communications network 100 will be deferred pending a discussion about the general architecture of the cellular telecommunications network.

Referring to FIG. 1, there is illustrated the general architecture of the exemplary cellular communications network 100 that can be used to implement the preferred admission control method 200. It should be noted that the illustrated configuration of the communications network 100 is only one of many possible configurations that may form a telecommunications network.

The cellular communications network 100 includes a plurality of cells 110a–110w that effectively divide an arbitrary geographic area into a plurality of contiguous radio coverage areas. A single base transceiver station (BTS) 125a–125w (only a few are labeled) is positioned within each cell 110a–110w for transmitting and receiving mobile communications to and from a mobile terminal (e.g., mobile terminal 130).

Different groups of cells (e.g., cells 110a–110c) are then associated with a particular base station controller (e.g., BSC-1 150). A number of BSCs (e.g., BSC-1 150 and BSC-2 155) may, in turn, be associated with a mobile services switching center/visitor location register 135(e.g., MSC/VLR 135) and an operation support system 140 (e.g., OSS 140). The OSS 140 provides an operator with supervisory functions for operating and maintaining the cellular communications network 100. As an illustration, the BSC-1 150 provides mobile service for cells 110a–110c, while the BSC-2 155 provides mobile service for cells 110d–110w. The BSC-1 150 and BSC-2 155 are in turn coupled to the MSC/VLR 135, which generally functions as an interface between the cellular telecommunications network 100 and an external telephone/data communication system such as a public switched telephone network (PSTN) 160.

Referring to FIG. 2, there is illustrated a simplified flow diagram of the admission control method 200 used within the cellular communications network 100. Generally, the admission control method 200 is performed within the BSC-2 155 (for example) and with reference to one of the cells 110a–110w referred to herein as a serving cell (e.g., cell 110w) in which a new call may be admitted after comparing the current speech qualities in the serving cell 110w and surrounding cells (e.g., cells 110d–110p) to minimum threshold values. The surrounding cells 110d–110p are interfered with by the serving cell 110w because they utilize the same channels or adjacent channels. In contrast, neighboring cells (e.g., neighboring cells 110q–110v) are generally not interfered with by the serving cell 110w because they utilize different channels as compared to the serving cell. In addition, the new call in relation to the mobile terminal 130 can be either an incoming call, an outgoing call or an ongoing call that may be handed over from one of the neighboring cells 110q–110v.

Beginning at step 202 of the admission control method 200, for each cell 110a–110w in the network 100 one or several speech quality measures (e.g., uplink speech quality and downlink speech quality) are computed. Each of the speech quality measures are computed from a subset of the mobile reports (described below) and corresponding BTS reports. Moreover, each of these measures reflects the current speech quality of the selected subset of reports, therefore, the reports used for these speech quality measures should not be too old. It should be understood that speech quality generally depends on a ratio of the carrier signal strength and the interference present on the same channel.

More particularly, the mobile reports used to determine the current speech qualities include measurements from a preselected number (subset) of mobile terminals (e.g., mobile terminal 130) and a base transceiver station (e.g., BTS 125w). The preselected mobile terminals each operate to make the following measurements: (1) the downlink signal strength from the cell currently serving the connection; (2) the downlink speech quality based on a bit error rate for a decoded digital signal from the cell currently serving the connection; and (3) a downlink signal strength from a number of cells that the mobile terminal can hear. In the GSM, the mobile terminal (e.g., mobile terminal 130) reports these measurements to the BTS (e.g., BTS 125w) every 0.48 seconds, and then the BTS operates to measure an uplink signal strength and uplink quality from the mobile station.

At step 204, when controlling the admission of calls to serving cell 110w, the cells for which to check the speech quality measures, are selected. The selected cells include the serving cell 110w, and cells within a downlink interference area 170 and/or an uplink interference area 175 (FIG. 1).

The downlink interference area 170 includes all cochannel cells and adjacent channel cells known as downlink cells (e.g., cells 100d–110i) in which the serving cell 110w causes non-negligible downlink interference. Likewise, the uplink interference area 175 includes all co-channel cells and adjacent channel cells known as uplink cells (e.g., cells 110j–110p) in which the serving cell 110w causes nonnegligible uplink interference. For clarity, the downlink cells 100d–110i and uplink cells 110j–110p have been illustrated as separate areas but in practice they often overlap one another and can include some if not all of the same cells.

The non-negligible uplink interference and the nonnegligible downlink interference can be estimated or measured to determine which cells belong within the downlink interference area 170 and the uplink interference area 175. An example of how to estimate which cells belong within the downlink interference area 170 is disclosed in U.S. patent application Ser. No. 08/940,648 and entitled "Estimating Downlink Interference in a Cellular Communications System" which is hereby incorporated into this specification. The Patent Application describes a method for estimating downlink interference in a cellular communication network using a Broadcast Channel Allocation (BA) list to determine cell-to-cell interdependencies and to create an interference matrix.

More specifically, the Patent Application describes where the BA lists of the cellular communications network are modified so that the mobile terminals in the network can measure downlink interference on predetermined Broadcast Control Channel (BCCH) frequencies. These downlink interference measurements are essentially downlink signal strength measurements that can be made on the BCCH frequencies in all of the cells where the mobile terminals are located. These downlink signal strength measurements are then reported back to a base station. Knowing the BCCH frequencies measured and the Base Station Identity Codes (BSICs) involved, the reported measurements are mapped to the corresponding cells. The ARFCN/BSIC mapping together with the reported downlink signal strength measurements are then used to produce the cell-to-cell interference matrix. The interference matrix can describe the differences in path loss between most of the cells in the network or, alternatively, Interference Ratio (C/I) or the Carrier-to-Adjacent Ratio (C/A) between those cells.

In the event the above-mentioned interference matrix is used to determine the downlink cells 110d–110i in the downlink interference area 170, then the uplink cells 110j–110p of the uplink interference area 175 may be predicted to include all of the surrounding cells 110d–110p that cause non-negligible downlink interference in the serving cell 110w. Because it is likely that the uplink cells 110j–110p of the uplink interference area 175 also cause non-negligible downlink interference in the serving cell 110w.

At step 206, a selection is made as to which of the measured speech qualities, in each selected cell, should be used by the base station controller BSC-2 155 to determine whether or not to admit the new call within the serving cell 110w. For example, there are three approaches that can be used to select which of the mobile reports are used in the determination of whether or not to admit the new call. The three approaches are referred herein as a cell level approach (step 208), a sub-cell level approach (step 210 and FIG. 3) and a combined approach (step 212) which are described in detail below.

Referring to the cell level approach at step 208, the desired result when determining whether or not to admit the new call is to maintain a predetermined statistical level of speech quality within the serving cell 110w and the interfered cells 110d–110p. The cell level approach in attaining the desired result utilizes all of the mobile reports received from the mobile terminals located in cells 110d–110p and 110w. Basically, the cell level approach functions to admit the new call unless the speech quality of the serving cell 110w or the speech quality of any one of the surrounding cells 110d–110p exceeds a minimum threshold of speech quality.

More specifically, the measured speech quality can be divided into two speech quality measurements that are computed on a cell basis and represented as Cell_Q_UL (uplink speech quality) and Cell_Q_DL (downlink speech quality). And, the minimum threshold of speech quality can be represented by Q_LIM_UL (uplink minimum threshold) and Q_LIM_DL (downlink minimum threshold). Therefore, the new call is not accepted in the serving cell 110w if:

Cell_Q_DL>Q_LIM_DL—within the serving cell 110w or any of the downlink cells 110d–110i forming the downlink interference area 170;

OR

Cell_Q_UL>Q_LIM_UL—within the serving cell 110w or any of the uplink cells 110j–110p forming the uplink interference area 175.

It should be understood that the minimum threshold of speech quality can be a different value for each one of the cells 110d–110p or 110w as compared to the two minimum threshold values described above.

Referring now to the sub-cell level approach illustrated at step 210 and FIG. 3, the underlying idea when controlling the admission of the new call into the serving cell 110w is to use the mobile reports from a portion (e.g., portion 302w) of the serving cell where the new call attempt is performed and the mobile reports from each portion (e.g., portions 302g, 302e) of the surrounding cells 110d–110p (e.g., surrounding cells 110e and 110g) in which the serving cell is actually interfering.

As compared to the cell level approach (step 208), the sub-cell level approach presupposes downlink speech quality measures in each cell (e.g., downlink cells 110e and 110g) that are measured as one per downlink interfering cell. For example, if the cell 110w causes downlink interference in cell 110e and cell 110g then there is a Cell_Q_DL (w) measure 304 within cell 110e, and a Cell_Q_DL(w) measure 306 within cell 110g.

However, a measurement report is used for the Cell_Q_DL(w) measure 304 (for example) in cell 110e only if the signal strength for the BCCH identified as emanating from cell 110w is sufficiently high as compared to the signal strength of the BCCH emanating from cell 110e (e.g., not more than 9 db lower). More specifically, the measurement report is used for the Cell_Q_DL(w) measure 304 in cell 110e only if a combination of the Absolute Radio Frequency Channel Number (ARFCN) and the BSIC of cell 110w is included in the mobile report of cell 110e and the signal strength of the BCCH in cell 110e is less than 9 db (typically) higher than the signal strength for the BCCH of cell 110w. It should be noted that a single mobile report might update Cell_Q_DL(x) for more than one cell x.

A Call Admission Interfering Cell can be defined as a cell (e.g., cell 110k) that downlink interferes with the serving cell 110w during the new call attempt and is identified as a "strong" interferer based on the signal strengths of the two BCCHs from the two relevant cells (e.g., cells 110k and 110w). For example, the cell_Q_DL(k) measure 308 in serving cell 110w is, when controlling the admission of calls, only considered if cell 110k is identified as a Call Admission Interfering cell.

Furthermore, there is a Cell Q DL(Rest) measure 310 that can be computed using the mobile reports for which the signal strength of the BCCH condition (described above) is not fulfilled for any of the downlink cells 110d–110i. The Cell_Q_DL(Rest) measure 310 is used when no "strong" downlink cells 110d–110i are identified. Therefore, the new call is not accepted in the serving cell 110w if:

Cell_Q_DL(w)>Q_LIM_DL—within any downlink cell (e.g., cells 110e and 110g) in the downlink interference area 170 of the serving cell 110w;

OR

If one or more Call Admission Interfering Cell(s) (X)is identified with respect to the serving cell 110w and Cell_Q_DL(X)>Q_LIM_DL—within the serving cell 110w, for any Call Admission Interfering Cell;

Else

Cell_Q_DL (Rest)>Q_LIM DL—within the serving cell 110w;

And

Cell_Q_UL>Q_LIM_UL—within the serving cell 110w or any Call Admission Interfering Cells (e.g., cell 110k) that belongs to the uplink interference area 175. The quality thresholds could possibly be different for the different quality measures.

It should be understood that for the sub-cell level approach to function properly the ARFCN of the downlink cells 110d–110i for a specific cell (e.g., serving cell 110w) should be included in the BA list for that specific cell.

Referring now to the combined approach illustrated at step 212, where certain aspects of the cell level approach (step 208) and the sub-cell level approach (step 210) are combined to determine whether or not to admit the new call. The combined approach (step 212) can be used to address a problematic circumstance where the new call is not admitted when the speech quality measure in one of the surrounding cells 110d–110p is critical but the bad quality present in the surrounding cells may be caused by interfering cells other than the serving cell 110w.

In such a situation, the combined approach (step 212) admits the new call in a circumstance where it is acceptable to have "bad" quality in small parts of a cell so long as the total quality in the cell is acceptable. Therefore, an exemplary way of describing the combined approach (step 212) follows such that the new call is not accepted in the serving cell 110w if:

Cell_Q_DL>Q_LIM_DL AND Cell_Q_DL(w)>Q_LIM_DL—within any downlink cell 110d–110i in the downlink interference area 170 of the serving cell 110w;

OR

Cell_Q_DL>Q_LIM_DL—within the serving cell 110w AND Cell_Q_DL(k)>Q_LIM_DL—within the serving cell 110w, for any Call Admission Interfering Cell (e.g., cell 110k);

OR

Cell_Q_UL>Q_LIM_UL—within the serving cell 110w or any Call Admission Interfering Cells (e.g., cell 110k) that belongs to the uplink interference area 175.

It should be understood the quality check could be different for the different quality measures. For example, if the admission control method 200 attempts to maintain "good" quality for 90% of the calls in the entire cell (e.g., serving cell 110w), then more than 90% of the calls should have "good" quality in the supervised portions of the cell.

From the foregoing, it can be readily appreciated by those skilled in the art that the present invention provides a method and cellular communications network capable of maintaining the speech quality within a serving cell and other cells interfered with by the serving cell by determining whether or not to admit a new call based on the current speech quality in the serving cell and the current speech quality in the other cells interfered with by the serving cell. Also, the admission control method as disclosed may maintain the speech quality by operating in accordance with a cell level approach, a sub-cell level approach or a combined approach to determine whether or not to admit the new call.

Although three embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for maintaining a desired level of speech quality in a cellular communications network by controlling the admission of a new call, said method comprising the steps of:

obtaining speech quality measures for each cell in said cellular communications network including a serving cell and at least one surrounding cell;

selecting one from among (a) a cell level speech quality measurement, (b) a sub-cell level speech quality measurement, and (c) a combination of both (a) and (b), for said serving cell and for said at least one surrounding cell; and determining whether to admit said new call by using the selected speech quality measurements in a manner that is determined according to whether (a), (b), or (c) is selected.

2. The method of claim 1, where said at least one surrounding cell includes at least one downlink interference area cell.

3. The method of claim 2, wherein if (a) is selected, then said step of determining includes admitting said new call unless a downlink interference of either said serving cell or said at least one downlink interference area cell exceeds a minimum threshold, or unless an uplink interference of either said serving cell or said at least one downlink interference area cell exceeds a minimum threshold.

4. The method of claim 2, wherein said new call includes a selected one of an incoming call, an outgoing call, and an ongoing call.

5. The method of claim 2, wherein if (b) is selected, then said step of determining includes admitting said new call unless a downlink interference caused by said serving cell in a portion of said at least one downlink interference area cell exceeds a minimum threshold, or unless a downlink interference caused by said at least one downlink interference area cell in a portion of said serving cell exceeds a minimum threshold.

6. The method of claim 5, wherein if neither the downlink interference in a portion of said serving cell nor the downlink interference in a portion of said at least one downlink interference area cell exceeds a minimum threshold, then said new call is admitted unless a downlink interference caused by substantially all downlink interference area cells in a portion of said serving cell exceeds a minimum threshold and an uplink interference of either said serving cell or said at least one downlink interference area cell exceeds a minimum threshold.

7. The method of claim 5, wherein said portion of said at least one downlink interference area cell corresponds to a location therein where said serving cell actually interferes with said at least one downlink interference area cell, and said portion of said serving cell corresponds to a location therein where said new call is attempted.

8. The method of claim 2, wherein if (c) is selected, said step of determining includes admitting said new call unless a downlink interference of said at least one downlink interference area cell exceeds a minimum threshold and a downlink interference caused by said serving cell in a portion of said at least one downlink interference area cell exceeds a minimum threshold, or a downlink interference of said serving cell exceeds a minimum threshold and a downlink interference caused by any call admission interfering cell in a portion of said serving cell exceeds a minimum threshold.

9. The method of claim 8, wherein said portion of said at least one downlink interference area cell corresponds to a location therein where said serving cell actually interferes with said at least one downlink interference area cell, and said portion of said serving cell corresponds to a location therein where said new call is attempted.

10. A cellular communications network for maintaining a desired level of speech quality by controlling the admission of a new call, said cellular communications network comprising:

means for obtaining speech quality measures for each cell in said cellular communications network including a serving cell and at least one surrounding cell;

means for selecting one from among (a) a cell level speech quality measurement, (b) a sub-cell level speech quality measurement, and (c) a combination of both (a) and (b), for said serving cell and for said at least one surrounding cell; and means for determining whether to admit said new call including means for using the selected speech quality measurements in a manner that is determined according to whether (a), (b), or (c) is selected.

11. The network of claim 10, wherein said at least one surrounding cell includes at least one downlink interference area cell.

12. The network of claim 11, wherein said new call includes a selected one of an incoming call, an outgoing call, and an ongoing call.

13. The network of claim 11, wherein if (a) is selected, then said means for determining includes means for admitting said new call unless a downlink interference of either said serving cell or said at least one downlink interference area cell exceeds a minimum threshold, or unless an uplink interference of either said serving cell or said at least one downlink interference area cell exceeds a minimum threshold.

14. The network according to claim 11, wherein if (c) is selected, said means for determining includes means for admitting said new call unless a downlink interference of said at least one downlink interference area cell exceeds a minimum threshold and a downlink interference caused by said serving cell in a portion of said at least one downlink interference area cell exceeds a minimum threshold, or a downlink interference of said serving cell exceeds a minimum threshold and a downlink interference caused by any call admission interfering cell in a portion of said serving cell exceeds a minimum threshold.

15. The network of claim 14, wherein said portion of said at least one downlink interference area cell corresponds to a location therein where said serving cell actually interferes with said at least one downlink interference area cell, and said portion of said serving cell corresponds to a location therein where said new call is attempted.

16. The network of claim 11, wherein if (b) is selected, then said means for determining includes means for admitting said new call unless a downlink interference caused by said serving cell in a portion of said at least one downlink interference area cell exceeds a minimum threshold, or unless a downlink interference caused by said at least one downlink interference area cell in a portion of said serving cell exceeds a minimum threshold.

17. The network of claim 16, wherein if neither the downlink interference in a portion of said serving cell nor the downlink interference in a portion of said at least one downlink interference area cell exceeds a minimum threshold, then said new call is admitted unless a downlink interference caused by substantially all downlink interference area cells in a portion of said serving cell exceeds a minimum threshold and an uplink interference of either said serving cell or said at least one downlink interference area cell exceeds a minimum threshold.

18. The network of claim 16, wherein said portion of said at least one downlink interference area cell corresponds to a location therein where said serving cell actually interferes with said at least one downlink interference area cell, and said portion of said serving cell corresponds to a location therein where said new call is attempted.

* * * * *

UNITED STATES PATENT AND TRADEMARK OFFICE
CERTIFICATE OF CORRECTION

PATENT NO.    : 6,510,321 B2
DATED         : January 21, 2003
INVENTOR(S)   : Benny Ritzen et al.

It is certified that error appears in the above-identified patent and that said Letters Patent is hereby corrected as shown below:

<u>Title page,</u>
Item [73], replace "Telefonaktiedolaget" with -- Telefonaktiebolaget --
Item [74], replace "Jenkins & Gilchrist" with -- Jenkens & Gilchrist --

<u>Column 4,</u>
Lines 14-15, replace "cochannel" with -- co-channel --
Lines 20-21, replace "nonnegligible" with -- non-negligible --
Lines 56, replace "alternatively, Interference Ratio" with -- alternatively, the interference matrix can describe the Carrier-to-Interference Ratio --

<u>Column 6,</u>
Line 16, replace "Cell Q DL(Rest)" with -- Cell_Q_DL(Rest) --
Line 31, replace "Q_LIM DL" with -- Q_LIM_DL --

Signed and Sealed this

Fifth Day of August, 2003

JAMES E. ROGAN
*Director of the United States Patent and Trademark Office*